United States Patent
Kim et al.

(10) Patent No.: US 10,939,254 B2
(45) Date of Patent: Mar. 2, 2021

(54) METHOD AND APPARATUS FOR OPERATING RESOURCES IN WIRELESS COMMUNICATION SYSTEM

(71) Applicant: Samsung Electronics Co., Ltd., Suwon-si (KR)

(72) Inventors: Minjae Kim, Suwon-si (KR); Junhyuk Song, Anyang-si (KR); Daejoong Kim, Yongin-si (KR); Hyungtaig Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/060,671

(22) PCT Filed: Dec. 8, 2016

(86) PCT No.: PCT/KR2016/014353
§ 371 (c)(1),
(2) Date: Jun. 8, 2018

(87) PCT Pub. No.: WO2017/099482
PCT Pub. Date: Jun. 15, 2017

(65) Prior Publication Data
US 2018/0367961 A1    Dec. 20, 2018

(30) Foreign Application Priority Data

Dec. 10, 2015 (KR) .................... 10-2015-0176205

(51) Int. Cl.
*H04W 56/00* (2009.01)
*H04W 4/10* (2009.01)
(Continued)

(52) U.S. Cl.
CPC ............. *H04W 4/10* (2013.01); *H04W 4/06* (2013.01); *H04W 24/10* (2013.01); *H04W 72/00* (2013.01);
(Continued)

(58) Field of Classification Search
CPC ......... H04W 4/10; H04W 76/27; H04W 4/06; H04W 24/10; H04W 72/00;
(Continued)

(56) References Cited

U.S. PATENT DOCUMENTS

2010/0172281 A1* 7/2010 Hus ................. H04L 1/1607
370/312
2010/0177676 A1   7/2010 Wang et al.
(Continued)

FOREIGN PATENT DOCUMENTS

GB    2485237 A        5/2012
WO    2009/045006 A1   4/2009
(Continued)

OTHER PUBLICATIONS

Ericsson, "Single-Cell Point-to-Multipoint Architecture Impacts", 3GPP Draft; R3-150755. 3rd Generation Partnership Project (3GPP). Mobile Competence Centre ; 650. Route Des Lucioles ; F-06921 Sophia-Antipolis Cedex, France, XP050937366. Retrieved from the Internet: URL:http://www.3gpp.org/ftp/Meetings 3GPP Sync/RAN3/Docs/, Apr. 11, 2015.
(Continued)

*Primary Examiner* — Sai Ming Chan
(74) *Attorney, Agent, or Firm* — Jefferson IP Law, LLP

(57) ABSTRACT

According to an embodiment of the present invention, provided are a method for providing a broadcast service of an MBMS coordination entity (MCE) in a mobile communication system, and an MCE for performing the same. The method comprises the steps of: transmitting a terminal
(Continued)

counting request message to at least one base station in a multicast-broadcast single frequency network (MBSFN) area; receiving a counting result message comprising the number of terminals receiving a multimedia broadcast multicast service (MBMS) session for each cell of the base station from the base station; and determining MBMS resource allocation for each cell in the MBSFN area on the basis of the counting result message. In addition, it is possible to provide a base station and a terminal operating together with the MCE, and a method for the operation thereof.

20 Claims, 13 Drawing Sheets

(51) Int. Cl.
| | | |
|---|---|---|
| *H04W 88/08* | (2009.01) | |
| *H04W 72/00* | (2009.01) | |
| *H04W 88/18* | (2009.01) | |
| *H04W 24/10* | (2009.01) | |
| *H04W 4/06* | (2009.01) | |
| *H04W 76/27* | (2018.01) | |
| *H04W 72/04* | (2009.01) | |

(52) U.S. Cl.
CPC ..... *H04W 72/005* (2013.01); *H04W 72/0473* (2013.01); *H04W 76/27* (2018.02); *H04W 88/08* (2013.01); *H04W 88/18* (2013.01); *H04W 88/182* (2013.01)

(58) Field of Classification Search
CPC ........... H04W 72/005; H04W 72/0473; H04W 88/08; H04W 88/18; H04W 88/182
USPC ...................................................... 370/329
See application file for complete search history.

(56) References Cited

U.S. PATENT DOCUMENTS

| | | | |
|---|---|---|---|
| 2010/0254352 A1 | 10/2010 | Wang et al. | |
| 2010/0265867 A1* | 10/2010 | Becker | H04W 72/005 370/312 |
| 2011/0154421 A1* | 6/2011 | Chun | H04N 21/2402 725/109 |
| 2012/0099504 A1 | 4/2012 | Hyun et al. | |
| 2012/0140619 A1 | 6/2012 | Chen | |
| 2012/0172031 A1 | 7/2012 | Marocchi et al. | |
| 2012/0202493 A1* | 8/2012 | Wang | H04W 60/00 455/435.1 |
| 2012/0213143 A1 | 8/2012 | Zhang et al. | |
| 2012/0259994 A1 | 10/2012 | Gillies et al. | |
| 2012/0263089 A1 | 10/2012 | Gupta et al. | |
| 2013/0051331 A1 | 2/2013 | Bao et al. | |
| 2013/0072167 A1 | 3/2013 | Aguirre et al. | |
| 2013/0294320 A1* | 11/2013 | Jactat | H04W 72/005 370/312 |
| 2013/0336189 A1 | 12/2013 | Mandil et al. | |
| 2014/0192701 A1 | 7/2014 | Drevo | |
| 2014/0286222 A1* | 9/2014 | Yu | H04W 24/08 370/312 |
| 2015/0078245 A1 | 3/2015 | Anchan | |
| 2015/0079979 A1 | 3/2015 | Anchan | |
| 2015/0230073 A1 | 8/2015 | Pandey et al. | |
| 2016/0249183 A1* | 8/2016 | Kim | H04H 20/59 |
| 2016/0249266 A1 | 8/2016 | Kim et al. | |
| 2017/0223663 A1* | 8/2017 | Mizusawa | H04L 67/322 |
| 2018/0077552 A1* | 3/2018 | Lee | H04W 72/12 |

FOREIGN PATENT DOCUMENTS

| | | |
|---|---|---|
| WO | 2015/065053 A1 | 5/2015 |
| WO | 2015/177040 A1 | 11/2015 |

OTHER PUBLICATIONS

"3 Generation Partnership Project Technical Specification Group Radio Access Network; Evolved Universal Terrestrial Radio Access Network (E-UTRAN); M2 Application Protocol (M2AP)(Release 13)", 3GPP Standard; 3GPP TS 36.443. 3rd Generation Partnership Project (3GPP). Mobile Competence Centre ; 650. Route Des Lucioles ; F-06921 Sophia-Antipolis Cedex, France, vol. No. V13. 1.0, Sep. 18, 2015, pp. 1-89, XP050996021.

NEC, DISC on MBMS service activation/deactivation further to counting', Nov. 15-19, 2010, 3GPP TSG-RAN2 Meeting #72, Jacksonville, Florida (US), R2-106488, XP050466202.

Nokia Networks, TP for Stage-3: handling the MBMS Session Start procedure in an un-involved MCE, Oct. 5-9, 2015, Anaheim, California, USA, R3-152551, XP051007423.

* cited by examiner

FIG. 9

MBMS SERVICE COUNTING RESULTS REPORT

| IE/Group Name | Presence | Range | IE type and reference | Semantics description | Criticality | Assigned Criticality |
|---|---|---|---|---|---|---|
| - Message Type | M | | 9.2.1.1 | | Yes | reject |
| - MBSFN Area ID | M | | 9.2.1.14 | | Yes | reject |
| - MBMS Counting Result List | M | | | | Yes | reject |
| > MBMS Counting Result Item | | 1 to <maxnoofcounting service> | | | EACH | reject |
| >>TMGI | M | | 9.2.3.3 | | | |
| >>Counting Result | M | | 9.2.1.21 | | | |
| >>ECGI | | | | | | |

MBMS Scheduling Information

| IE/Group Name | Presence | Range | IE type and reference | Semantics description | Criticality | Assigned Criticality |
|---|---|---|---|---|---|---|
| - Message Type | M | | 9.2.1.1 | | Yes | reject |
| - MCCH Update Time | M | | 9.2.1.19 | | Yes | reject |
| - MBSFN Area Configuration List | | 1 | | | Yes | reject |
| > MBMS Area Configuration Item IEs | | 1 to <maxnoofcounting service> | | | EACH | reject |
| >>PMCH Configuration List | | 1 | | | Yes | |
| >>Applied ECGI | | 1 to maxnoofCells within MBSFNarea | | | | reject |

METHOD AND APPARATUS FOR OPERATING RESOURCES IN WIRELESS COMMUNICATION SYSTEM

TECHNICAL FIELD

The present invention relates to a method and apparatus for resource management in a wireless communication system. The present invention also relates to a counting technique in the multimedia broadcast multicast service (MBMS) and a method and apparatus for managing radio resources based on the counting technique. The present invention further relates to a counting technique for public safety long term evolution (PS-LTE) terminals and a method and apparatus for managing radio resources based on the counting technique.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

To meet this demand, the 3rd generation partnership project (3GPP) has been working to standardize specifications for the long term evolution (LTE) system as a next generation mobile communication system. The LTE system aims to realize high-speed packet based communication supporting a data rate of about 100 Mbps. To this end, various approaches have been considered, such as reducing the number of nodes on a communication path through simplification of the network architecture and bringing wireless protocols as close as possible to wireless channels.

Meanwhile, in the data service, unlike the voice service, resources to be allocated are determined according to the amount of data to be transmitted and the channel conditions. Hence, in a wireless communication system such as a mobile communication system, the scheduler manages allocation of transmission resources in consideration of the amount of available resources, the channel conditions, and the amount of data to be transmitted. This is also applied to the LTE system, which is one of the next generation mobile communication systems, and the scheduler located at the base station manages and allocates radio transmission resources.

Recently, discussions are underway on the evolved LTE communication system (LTE-advanced, LTE-A) that improves the transmission speed by combining various new technologies with the LTE communication system. The LTE-A system includes improvement of the multimedia broadcast multicast service (MBMS). The MBMS is a broadcasting service provided through the LTE system.

DISCLOSURE OF INVENTION

Technical Problem

Accordingly, an aspect of the present invention is to provide a method and apparatus for resource management in a wireless communication system. Another aspect of the present invention is to provide a counting technique for the multimedia broadcast multicast service (MBMS), and a method and apparatus for managing radio resources based on the counting technique.

Solution to Problem

In accordance with an aspect of the present invention, there is provided an MBMS coordination entity (MCE) providing a public safety (PS) service in a mobile communication system. The MCE may include: a communication unit configured to transmit and receive a signal; and a controller configured to control transmitting a PS terminal counting request message to at least one base station in a PS service area, receiving a counting result message including information on the number of PS terminals receiving a PS service session for each cell of the base station from the base station, and determining PS service resource allocation for each cell in the PS service area on the basis of the counting result message.

In accordance with another aspect of the present invention, there is provided a base station providing a public safety (PS) service in a mobile communication system. The base station may include: a transceiver unit configured to transmit and receive a signal; and a controller configured to control receiving a first terminal counting request message indicating the number of PS terminals for each cell in a PS service area from an MBMS coordination entity (MCE), transmitting a second terminal counting request message from each cell of the base station to PS terminals based on the first terminal counting request message, receiving a response message indicating whether the PS service session is received by each PS terminal from the PS terminal, transmitting a counting result message including information on the number of PS terminals for each cell of the base station to the MCE on the basis of the response messages, and receiving PS service resource allocation information for each cell in the PS service area, prepared by the MCE based on the counting result message, from the MCE.

In accordance with another aspect of the present invention, there is provided a method for an MBMS coordination entity (MCE) to provide a broadcast service in a mobile communication system. The method may include: transmitting a terminal counting request message to at least one base station in a multicast broadcast single frequency network (MBSFN) area; receiving a counting result message including information on the number of terminals receiving a multimedia broadcast multicast service (MBMS) session for each cell of the base station from the base station; and determining MBMS resource allocation for each cell in the MBSFN area based on the counting result message.

In accordance with another aspect of the present invention, there is provided an MBMS coordination entity (MCE) providing a broadcast service in a mobile communication system. The MCE may include: a communication unit configured to transmit and receive a signal; and a controller configured to control transmitting a terminal counting request message to at least one base station in a multicast broadcast single frequency network (MBSFN) area, receiving a counting result message including information on the number of terminals receiving a multimedia broadcast multicast service (MBMS) session for each cell of the base station from the base station, and determining MBMS resource allocation for each cell in the MBSFN area based on the counting result message.

In accordance with another aspect of the present invention, there is provided a method for a base station to provide a broadcast service in a mobile communication system. The method may include: receiving a first terminal counting request message indicating the number of terminals for each cell in a multicast broadcast single frequency network (MBSFN) area from an MBMS coordination entity (MCE); transmitting a second terminal counting request message from each cell of the base station to terminals based on the first terminal counting request message; receiving a response message indicating whether the MBMS session is received by each terminal from the terminal; transmitting a counting result message including information on the number of terminals for each cell of the base station to the MCE based on the response messages; and receiving MBMS resource allocation information for each cell in the MBSFN area, prepared by the MCE based on the counting result message, from the MCE.

In accordance with another aspect of the present invention, there is provided a base station providing a broadcast service in a mobile communication system. The base station may include: a transceiver unit configured to transmit and receive a signal; and a controller configured to control receiving a first terminal counting request message indicating the number of terminals for each cell in a multicast broadcast single frequency network (MBSFN) area from an MBMS coordination entity (MCE), transmitting a second terminal counting request message from each cell of the base station to terminals based on the first terminal counting request message, receiving a response message indicating whether the MBMS session is received by each terminal from the terminal, transmitting a counting result message including information on the number of terminals for each cell of the base station to the MCE based on the response messages, and receiving MBMS resource allocation information for each cell in the MBSFN area, prepared by the MCE based on the counting result message, from the MCE.

Aspects or objects of the present invention are not limited to those described above. Other aspects and salient features of the present invention will become apparent to those skilled in the art from the following detailed description.

Advantageous Effects of Invention

In a feature of the present invention, there are provided a method and apparatus for resource management in a wireless communication system. In another feature of the present invention, there are provided a counting technique for terminals in the multimedia broadcast multicast service (MBMS), and a method and apparatus for managing radio resources based on the counting technique.

BRIEF DESCRIPTION OF DRAWINGS

FIG. 9 illustrates information elements (IE) for messages according to an embodiment of the present invention.

MODE FOR THE INVENTION

Hereinafter, various embodiments of the present invention are described in detail with reference to the accompanying drawings. The same or similar reference symbols are used throughout the drawings to refer to the same or like parts. Descriptions of well-known functions and structures incorporated herein may be omitted to avoid obscuring the subject matter of the present invention. Descriptions of components having substantially the same configurations and functions may also be omitted.

In the following description, the public safety network or public safety LTE (PS-LTE) may mean a network supporting a Push-to-Talk (PTT) service based on enhanced MBMS technology for large capacity group communication. The public safety network or PS-LTE aims to provide communication services for public safety or in disaster situations. The terminals may be classified into a terminal capable of receiving the PS-LTE service and a terminal incapable of receiving the PS-LTE service.

The public safety service of the present invention may mean a service provided through a public safety network based on the eMBMS technology. In an embodiment of the present invention, a PS-LTE terminal is described as an example of a terminal supporting the public safety service. However, the present invention is not limited thereto. The public safety service may be referred to as a disaster network service, and the PS-LTE terminal may be referred to as a disaster network terminal.

The evolved multimedia broadcast multicast service (eMBMS) is a service that broadcasts multimedia content such as voice and video data to a plurality of users in the LTE system. LTE base stations (eNBs) are basically organized into multicast broadcast single frequency network (MBSFN) areas, and tens to hundreds of base stations in one MBSFN area transmit the same content simultaneously. That is, in the same MBSFN Area, the number, quality, and broadcast time of multimedia sessions (e.g., broadcast channels) that terminals can receive are the same regardless of which base stations the terminals are attached to. One base station (eNB) is composed of 1 to 30 radio units (RUs), and the area served by each RU is called a cell. As a result, one MBSFN area is composed of tens to hundreds of base stations, and each base station includes about 30 cells broadcasting the same content. To this end, all base stations belonging to the same MBSFN area need to allocate radio resources identically in a synchronized manner. The MBMS coordination entity (MCE) is newly specified for this purpose.

Figure 1:
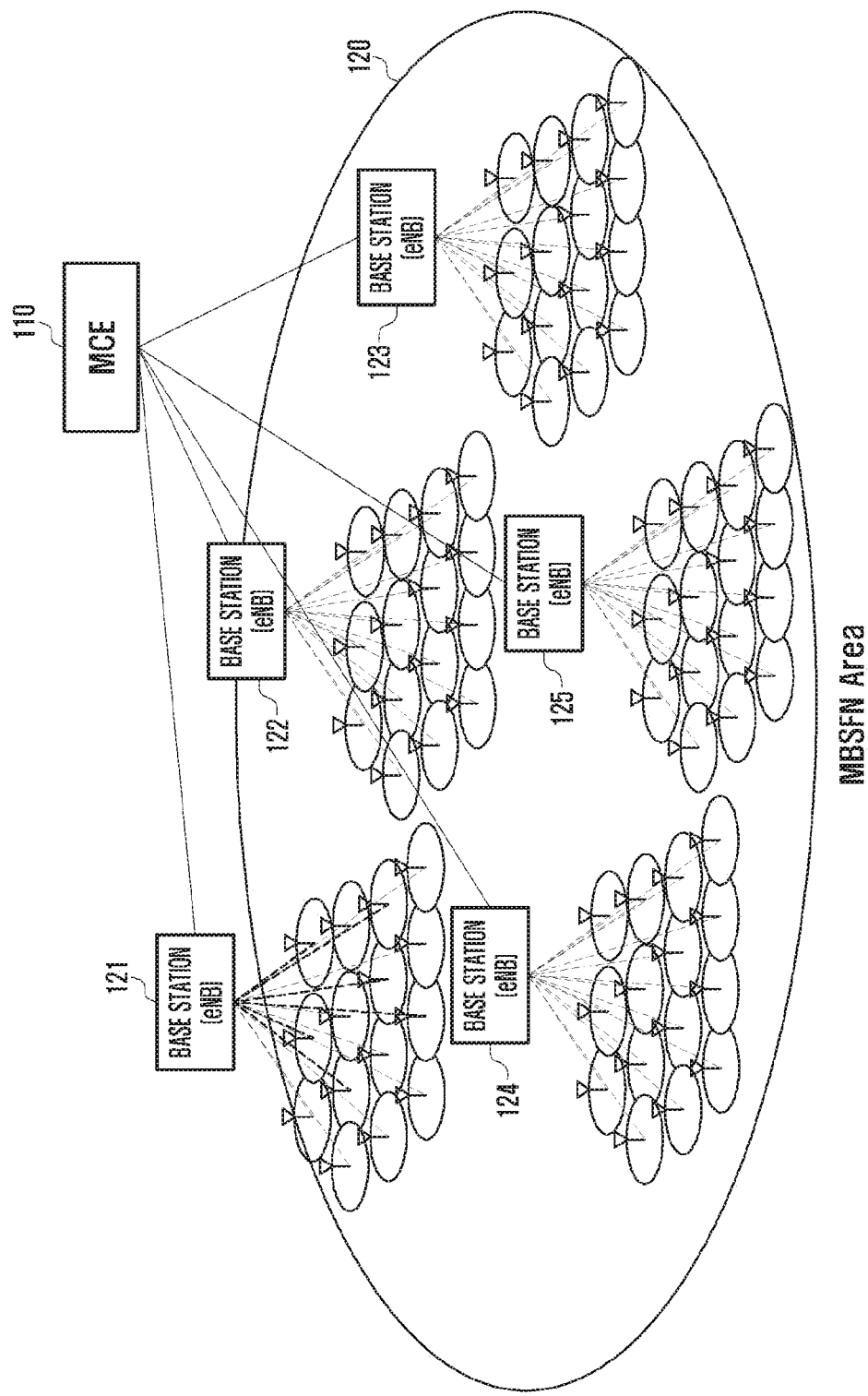
FIG. 1 illustrates the MCE and MBSFN area according to an embodiment of the present invention.

FIG. 1 illustrates the MCE and MBSFN area according to an embodiment of the present invention.

As shown in FIG. 1, the MCE 110 may manage a large number of MBSFN areas 120, and exchange eMBMS resource allocation control messages with many base stations in each MBSFN area 121, 122, 123, 124 or 125. According to the current specification of the LTE system, among the radio resources, time domain resources are divided into subframes and a specific location (MBSFN subframe) can be used only for the eMBMS service.

Figure 2:
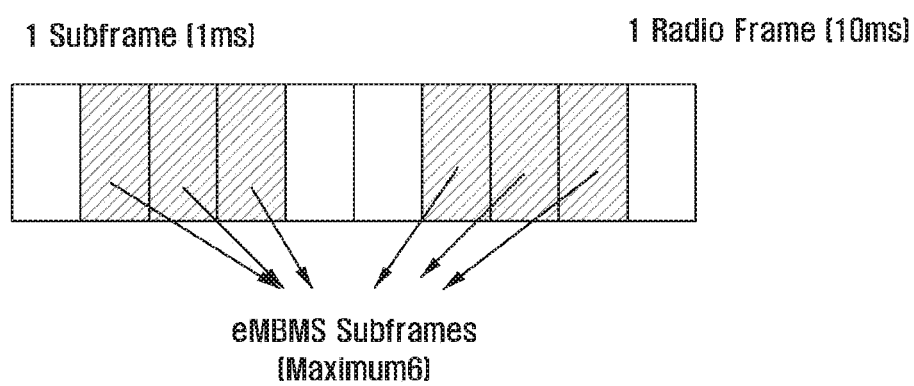
FIG. 2 illustrates the position of an eMBSFN subframe according to an embodiment of the present invention.

FIG. 2 illustrates the position of an eMBSFN subframe according to an embodiment of the present invention.

With reference to FIG. 2, in the case of frequency division duplex (FDD) of the 3GPP specification, up to 60 percent of the maximum radio resources can be used for the eMBMS service. The MCE 110 determines the amount of radio resources to be used for the eMBMS service within the given amount of resources and transmits radio resource allocation information to each base station.

In the case of FDD of the 3GPP specification, up to six subframes among ten subframes in each radio frame can be used as an MBSFN subframe. In the LTE system, the frequency domain is divided into resource blocks (RBs) so that frequency domain resources can also be divided for usage. For the eMBMS, the current specification (up to 3GPP Rel-12) specifies that all the frequency bandwidths in the frequency domain should be used at once, and resources can be separately allocated only in units of MBSFN subframes of the time domain.

The MCE 110 may exist as a logical function within the base station, or exist independently in the form of a server outside the base station as shown in FIG. 1. In an embodiment of the present invention, the case where the MCE 110 is located outside the base station is considered. However, the proposed method can also be applied to the case where the MCE 110 is located inside the base station.

The eMBMS may be more valuable than one-to-one unicast transmission because it can utilize the radio resources very efficiently, and is expected to attract more attention in the mobile communication market where the broadband frequency resource is needed in the future. Particularly in the LTE-based public safety (PS-LTE) service, the structure where one terminal talks to a plurality of terminals being members of group communication through the mission critical Push-to-Talk (MCPTT) functionality corresponds to a type of service in which broadcasting is more important. Hence, it is possible to have an advantage in network stability and frequency efficiency for the public safety by applying broadcast-specific eMBMS functionalities.

If the number of receiving users is small, unicast transmission may be advantageous over broadcast transmission through the eMBMS. Since the eMBMS is basically a broadcast service, it may be unable to identify the number of receiving terminals because it only performs downlink transmission without exchanging messages with terminals. During broadcast transmission, the user equipment (UE) counting function can be used in the eMBMS to identify the number of terminals actually receiving the broadcast.

Figure 3:
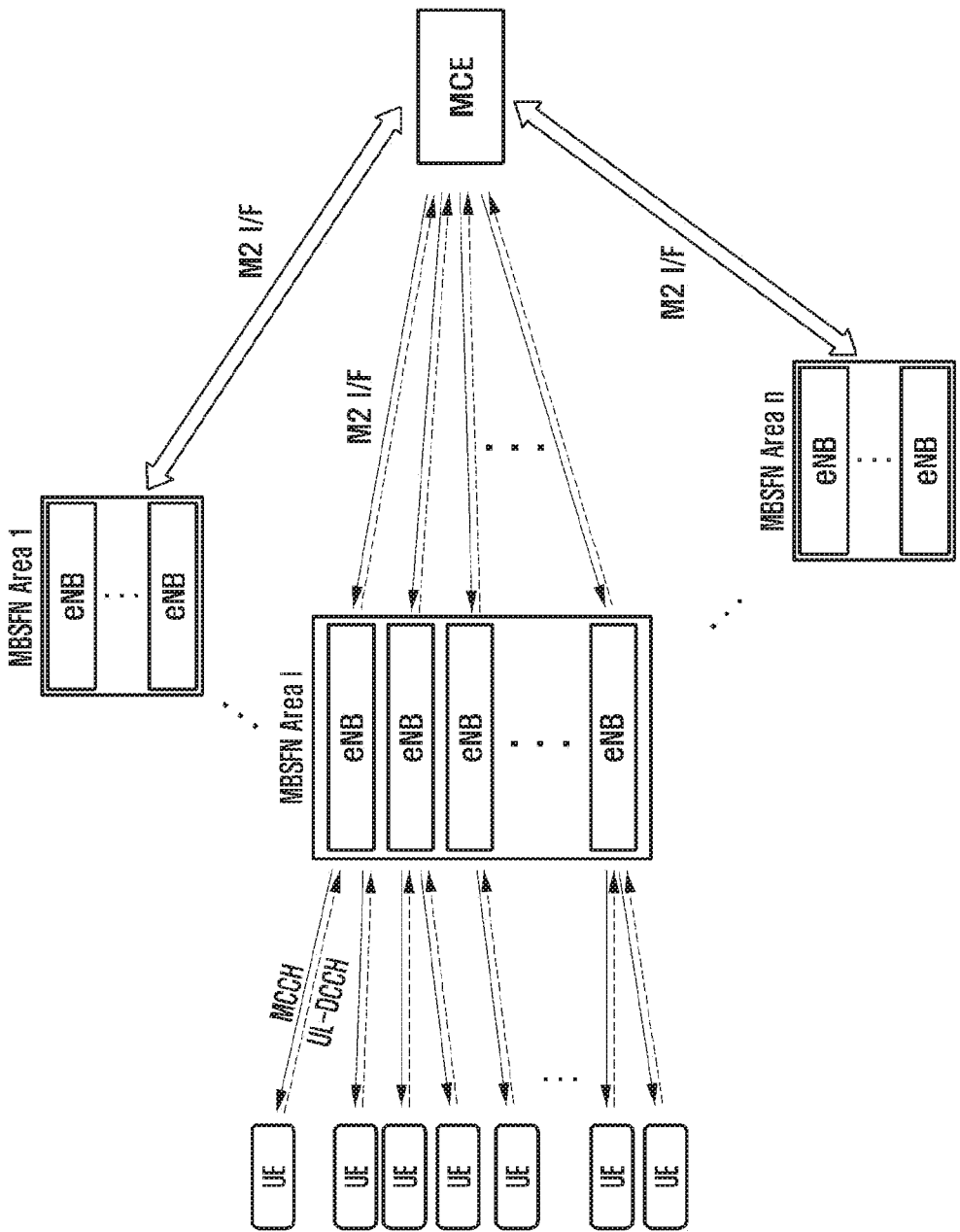
FIG. 3 illustrates the interface through which messages for counting are delivered according to an embodiment of the present invention.

FIG. 3 illustrates the interface through which messages for counting are delivered according to an embodiment of the present invention.

With reference to FIG. 3, for the counting function, the M2 interface between the MCE and the base station of an MBSFN area can be utilized. The terminal and the base station can use the MCCH (multicast control channel) and the UL-DCCH (uplink dedicated control channel) as interfaces.

Figure 4:
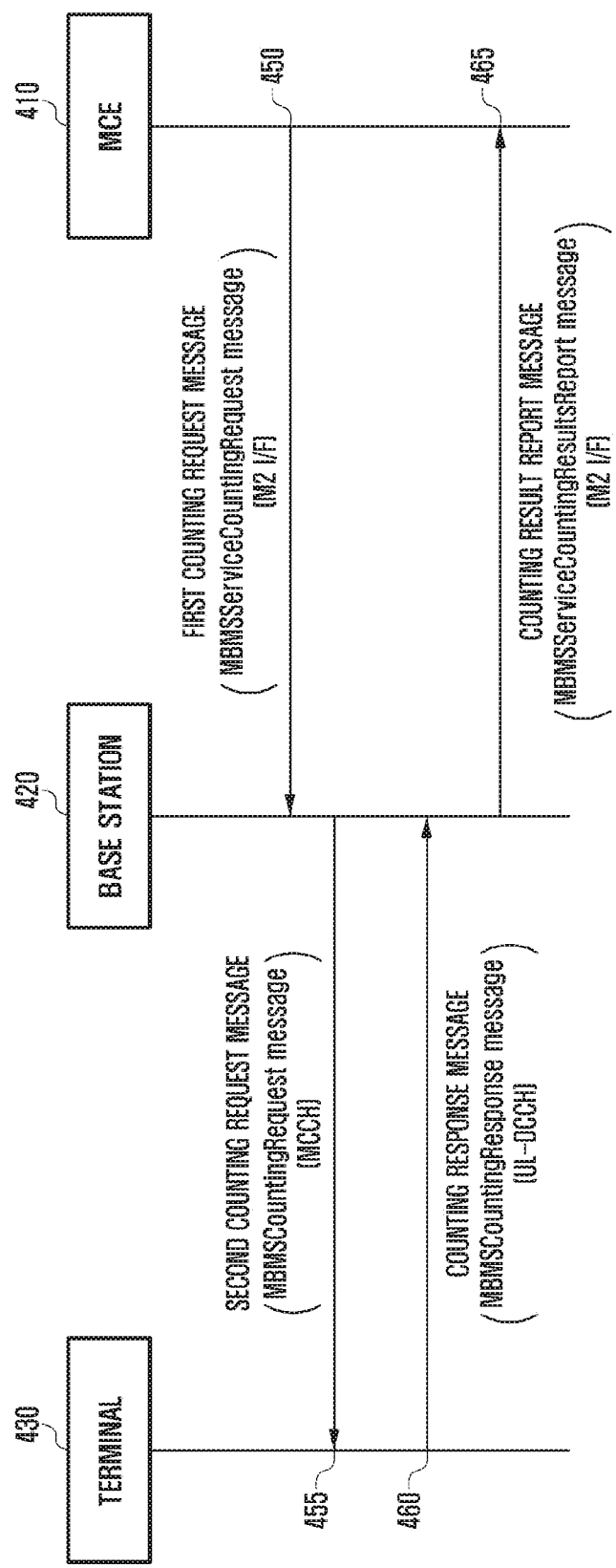
FIG. 4 is a sequence diagram illustrating the flow of messages in the embodiment shown in FIG. 3.

FIG. 4 is a sequence diagram illustrating the flow of messages in the embodiment shown in FIG. 3.

With reference to FIG. 4, the system may include an MCE 410, a base station 420, and a terminal 430. Each entity may appear as multiple instances, but one entity appears once in FIG. 4 for ease of description.

At operation 450, the MCE 410 may transmit a first counting request message to the base station 420. The first counting request message may be an MBMSserviceCountingRequest message. The MCE 410 managing resource allocation for the eMBMS can request all the base stations 420 belonging to the MBSFN area managed by it to count terminals. The counting request may be a request for the number of terminals receiving the MBSFN service. The MCE 410 may transmit the first counting request message to the base station 420 of the MBSFN area via the M2 interface.

Upon receiving the counting request from the MCE 410, the base station 420 may transmit a second counting request message to the terminal 430. The second counting request message may be an MBMSCountingRequest message. Each base station 420 transmits the second counting request message to the terminal 430 in the RRC (radio resource control) connected state to inquire whether the current sessions of the eMBMS service are received. The base station 420 may transmit the second counting request message to the terminal 430 via the multicast control channel (MCCH).

At operation 460, the terminal 430 may transmit a counting response message to the base station 420 in return to the second counting request message. The terminal 430 may transmit the base station 420 an eMBMSCountingResponse message including information on the session that is to be received or currently being received via session information from the SNS or the Web. The terminal 430 may transmit the response message to the base station 420 via the UL-DCCH.

At operation 465, the base station 420 may send a counting result report message to the MCE 410. The counting result report message may be an MBMSServiceCountingResultsReport message. The base station 420 transmits the counting result received from the terminal 430 to the MCE 410, so that the MCE 410 can identify the number of receiving terminals for each session in the corresponding MBSFN area. The base station 420 may transmit the counting result report message to the MCE 410 via the M2 interface.

In this way, the MCE 420 can obtain information on the number of receiving terminals for each session provided in the eMBMS.

After obtaining information on the number of receiving terminals for each session provided in the eMBMS through the terminal counting, the MCE determines whether to transmit the eMBMS for each session in the MBSFN area based on the number of receiving terminals in the MBSFN area. That is, if the number of receiving terminals in a session is less than a threshold set for the session, the eMBMS is turned off to reclaim the radio resources (eMBMS suspension); and if the number of receiving terminals is large, the eMBMS is broadcast again to the session (eMBMS resumption). Here, the management of radio resource is always performed by the MBSFN area, and the radio resource allocation is always the same for any base station or cell in the MBSFN area.

The number of terminals serving as the basis for determining whether to perform broadcast transmission or unicast transmission can be optimally set by the network operator according to the network conditions. For example, simply considering a reference value for one radio frame in one cell, when three of 10 subframes are used for the eMBMS and the MCS level is 9 (QPSK) for transmission in the 20 MHz band, broadcast transmission may be more efficient for resource utilization when the number of terminals is three or more.

If the counting result is less than the threshold and the radio resource assigned to the eMBMS session is reclaimed, the terminal listening to the session will be disconnected from the eMBMS service, experiencing the same situation as when the eMBMS service is out of coverage. Here, if the terminal is disconnected from the eMBMS, this may be notified to the user and the session content can be continuously provided by switching to unicast transmission through application support. However, an interruption may occur during this switching. In such a case, the mobile network operator may implement a packet streaming server (PSS) and the terminal may interwork with the PSS at the application layer, thereby enabling seamless switching to unicast transmission.

In the mission critical Push-to-Talk (MCPTT) service of the PS-LTE network, for group communication, one terminal talks and the remaining terminals in the group receive the talk. For this group communication, the group communication service application server (GCS AS) may broadcast at the application layer, but may also broadcast at the radio layer using the eMBMS.

In the embodiment of FIG. 4, the counting is performed on the terminals in the RRC connected state. However, the eMBMS service can be received by not only terminals in the RRC connected state but also terminals in the idle state. Hence, for accurate counting, it is necessary to include terminals in the idle state in counting. When the terminals in the idle state are excluded from the counting, the counting result must be less than the number of terminals actually receiving the eMBMS service. To apply the counting to turning the eMBMS on/off, terminals in the idle state should also be included in the terminal counting.

Additionally, in the MBSFN area including tens of thousands to hundreds of thousands of cells, the same content is transmitted through the same resource allocation, so that it may be unable to obtain the multiplexing gain between the separate cells. In the case of unicast transmission, different radio resources are allocated at the same resource location for each cell, so that a large number of cells can achieve a large multiplexing gain. That is, while the eMBMS has higher radio resource utilization than unicast transmission as the number of terminals increases in a single cell, unicast transmission can achieve a large multiplexing gain in proportion to the increasing number of cells. On the other hand, as the eMBMS transmits the same content in all cells, there is no multiplexing gain, and the radio resource utilization becomes relatively low. As a result, the multiplexing gain cannot be obtained when thousands to tens of thousands of cells transmit using the same resources, which limits the optimal utilization of the radio resources.

Further, in the MBSFN area including thousands to tens of thousands of cells, there are usually tens of thousands to hundreds of thousands of terminals. Resource utilization efficiency may vary depending on the distribution of such a large number of terminals in the MBSFN area. For example, if the number of eMBMS receiving terminals in the MBSFN area is greater than the threshold, it may be determined to turn the eMBMS on for the corresponding session. However, when the eMBMS receiving terminals are dense only in a specific base station or cell, eMBMS transmission may be rather inefficient. In such a case, it may be possible to achieve higher efficiency in utilization of radio resources and transmission power by transmitting via unicast through the corresponding resources or not transmitting when interference occurs between neighbor eMBMS transmission sections.

Consequently, it is not easy to obtain the advantage of resource utilization efficiency through turning the eMBMS on/off in the whole MBSFN area because the MBSFN area is generally very wide.

In the following description, to solve the problem that the eMBMS receiving terminal counting is limited to terminals in the RRC connected state and the number of correct eMBMS receiving terminals cannot be identified, a counting method considering terminals in the idle state is presented. This makes it possible to accurately survey audience ratings of the content provided through the basic eMBMS, and to improve the utilization efficiency of the eMBMS frequency resources based on the counting result.

In addition, it is possible to optimally manage the eMBMS frequency resources and the base station transmission power by allocating the radio resources for the eMBMS in units of cells or base stations instead of the MBSFN area unit.

In the mission critical Push-to-Talk (MCPTT) service of the PS-LTE network, broadcast transmission is more important. Hence, when the eMBMS is applied, the advantage of the eMBMS is expected to become more noticeable. In the case of MCPTT terminal counting, as securing accurate information on the number of receiving terminals can be of great help in an emergency situation, it is necessary to count those terminals in the idle state in the public safety network. In addition, flexible turning on/off of the eMBMS may contribute to the efficient use of public safety frequency resources and efficient base station operation for low power consumption considering an emergency situation where securing power is not easy.

In the method proposed in the following embodiment, terminals in the idle state are included in the terminal counting, and the base station or cell in the MBSFN area determines whether to transmit the eMBMS for each session on the basis of the counting result. In the base station or cell where the eMBMS is determined to be turned off for a specific session, the MBSFN subframe at the corresponding position may be used for unicast transmission to thereby improve radio resource utilization efficiency, or may be not used at all for data transmission to thereby reduce transmission power.

In the proposed terminal counting method considering terminals in the idle state, the base station broadcasts a paging message before counting to thereby transition terminals in the idle state to the RRC connected state. Here, when the paging message is sent to all the terminals at once, if the number of idle terminals exceeds the capacity of the base station for the RRC connected terminals, some idle terminals may be rejected in the RRC connection and excluded from the counting.

Therefore, in one embodiment, for paging, multiple paging intervals are set and the paging message is sent only to terminals capable of receiving the paging message (terminals awaken from the sleep mode) during a specific paging interval, and the counting is performed after causing these terminals to transition to the RRC connected state. This process is repeated for all the paging intervals to obtain the counting result for all the terminals. In other words, as the capacity of the base station for RRC connected terminals is limited, it is not possible to count all the terminals at once. Hence, only some terminals are caused to transition to the RRC connected state and the counting is performed. This process is repeated several times to obtain the counting result for all terminals.

Although the number of all terminals in the MBSFN area is known through the counting process, as the MBSFN area is very wide, it may be difficult to have a practical advantage of turning on/off of the eMBMS service owing to the distribution of terminals. In one embodiment, to resolve this problem, after allocating resources by turning on/off of the eMBMS service for each session in the MBSFN area, whether to transmit the eMBMS may be determined for each base station or cell. This determination may be made at the MCE or at the base station. For each base station or cell, the MBSFN subframe resource corresponding to the session in which eMBMS transmission is not performed may be used for unicast transmission at an output level not causing interference to the surroundings, or may be not used for transmission to thereby reduce transmission power.

For example, assume that five eMBMS sessions are transmitted in the MBSFN area through the terminal counting and five of 10 subframes (1 ms) are used in every radio frame (10 ms). If it is determined in a particular cell to use only one of the five sessions as a result of counting, only one MBSFN subframe corresponding to the session may be used for eMBMS transmission in the cell, and those MBSFN subframes corresponding to the remaining four sessions may be used for unicast transmission in the cell or may be not used for transmission to thereby reduce power consumption of the RU.

By repeating the above process from counting to eMBMS resource allocation periodically, it is possible to operate the network so that the use of eMBMS radio resources and power is optimized according to the number of terminals varying with time.

Figure 5:
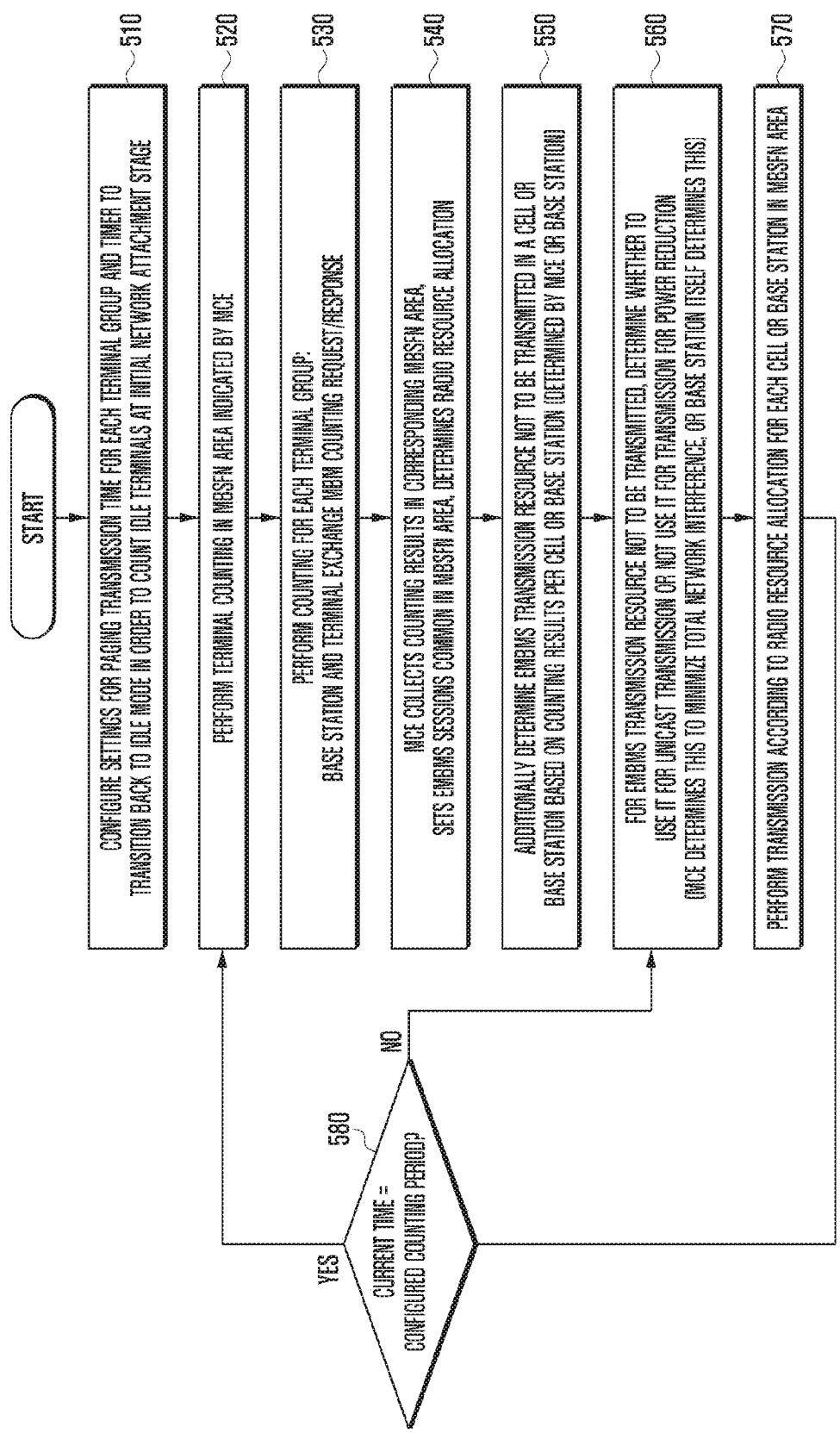
FIG. 5 illustrates a resource management method according to an embodiment of the present invention.

FIG. 5 illustrates a resource management method according to an embodiment of the present invention.

With reference to FIG. 5, at operation 510, the MCE may configure settings for terminal counting. These terminal counting settings may include information about whether to include idle terminals in the counting, a paging transmission time for counting terminals, and a timer to return to the idle mode. In one embodiment, the terminal counting settings may be configured so that idle terminals are included in the counting result. The terminal counting settings may also be configured so that a paging message is sent to idle terminals for counting. Here, it is possible to set information regarding the counting period, the paging message transmission period, and the time to return to the idle mode after paging.

At operation 520, the MCE may send a terminal counting command to the base stations in the MBSFN area. The MCE may transmit a terminal counting command to all or some base stations in the MBSFN area. For example, the MCE may select a specific base station based on the result of counting terminals in the RRC connected state in each base station. For example, the MCE may not transmit a terminal counting command considering idle terminals to a base station whose counting result for the terminals in the RRC connected state is greater than a threshold value.

The terminal counting command may be a first counting request message. The first counting request message may be an MBMSserviceCountingRequest message. The MCE may transmit the first counting request message via the M2 interface to the base station in the MBSFN area.

Upon receiving the terminal counting command from the MCE, at operation 530, the base station transmits a paging message in at least one cell managed by it. Thereby, the base station may cause idle terminals in the cell operated by it to transition to the RRC connected state. When the base station transmits a paging message to all terminals, it may be not possible to count all the terminals at once owing to the capacity limit for RRC connected terminals. Hence, terminals can be grouped into n groups (n is an integer greater than or equal to 1) and a paging message can be sent to one of the n groups of terminals. This is described in more detail with reference to FIG. 6.

Figure 6:
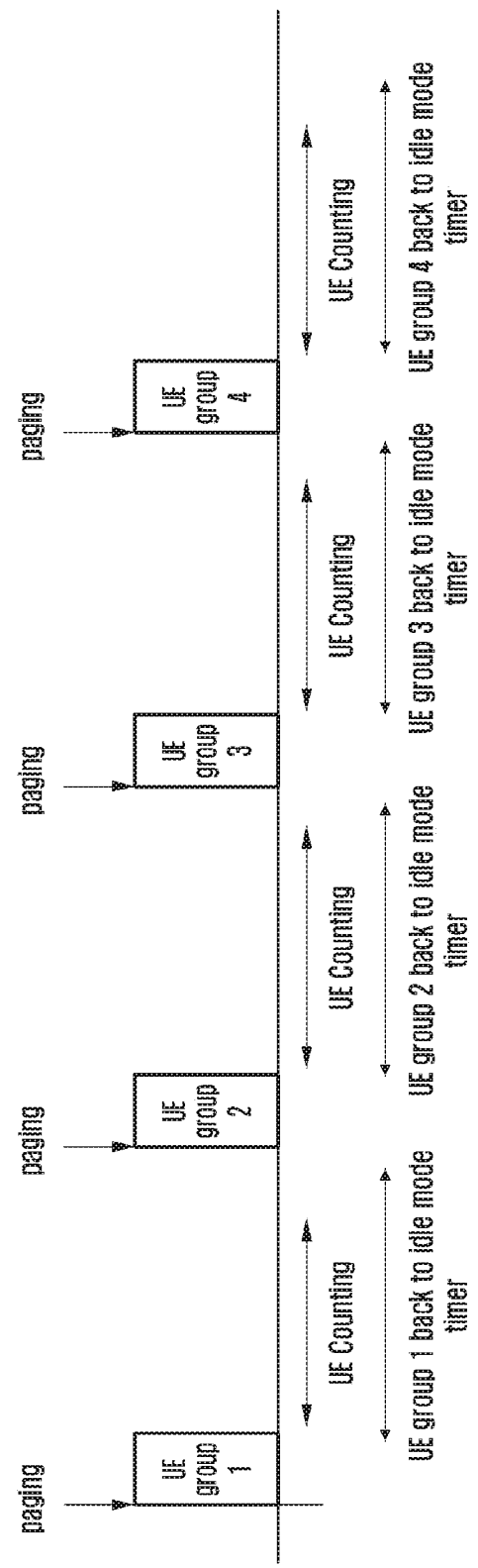
FIG. 6 illustrates a method of counting idle terminals according to an embodiment of the present invention.

FIG. 6 illustrates a method of counting idle terminals according to an embodiment of the present invention.

In FIG. 6, the base station may group terminals in the cell into n groups, so that the terminals belonging to the same group may receive the paging message at the same time and transition to the RRC connected state. The international mobile subscriber identity (IMSI) of the terminal can be used for grouping. The IMSI is a unique identifier of a terminal. Those terminals with the same "IMSI mod n" value can belong to the same group. The grouping may be performed in various ways and is not limited to the above method using the IMSI.

For example, in FIG. 6, the base station transmits a paging message to one of four terminal groups. When the counting is completed for a specific terminal group, the terminals of the group should transition back to the idle mode so that next group terminals are not rejected due to the RRC connection capacity limit when they transitions to the RRC connected state. To this end, a timer (UE group back to idle mode timer) may be set to cause the idle terminals to transition back to the idle mode within a given time after transmission of the paging message for counting idle terminals. This timer may be set for each terminal. A terminal may be provided with the above timer when it is attached to the network, and may receive a message for returning to the idle mode or receive timer setting information during the counting process after reception of the paging message for counting.

The counting procedure for a specific terminal group is as follows. First, upon receiving the counting request from the MCE, the base station sends a counting request (MBMS counting request) message to the RRC-connected terminals. This message contains a list of available sessions in the corresponding MBSFN area. Upon receiving the MBMS counting request, the terminal in the MBSFN area indicates the session that is being received or to be received, and transmits a counting response (MBMS counting response) message containing the indicated session information to the corresponding base station. The base station may repeat the above process for each group to collect terminal counting information for all terminals.

At operation 540, the MCE may receive the counting results from the base stations in the MBSFN area. After the counting is completed for all terminals, each base station may forward the collected counting responses to the MCE as a counting result. Here, the base station may transmit the counting result for each cell to the MCE.

The MCE may determine the sessions where eMBMS transmission is to be used in the MBSFN area by comparing the received counting result with a preset threshold, and allocate resources correspondingly. Here, it is possible to determine the session where eMBMS transmission is to be used by comparing the number of receiving terminals in all cells in the MBSFN area with the threshold value set for the MBSFN area as in the prior art. It is also possible to determine a set of sessions where eMBMS transmission is to be used by comparing the number of terminals in a cell or base station with the threshold value set for the cell or base station, and determine the set of sessions to be sent over the entire MBSFN area as a superset. If the size of the superset is beyond the serviceable range of the MBSFN area, the number of sessions allocable in the MBSFN area or the amount of radio resources to be allocated may be reduced by removing the session desired by the smallest number of cells or base stations first from the superset.

After determining the session where eMBMS transmission is to be used and resource allocation in the MBSFN area, at operation 550, the eMBMS resource is allocated only to the preferred session based on the counting result of each cell or base station, and eMBMS resource allocation is not performed for the non-preferred session. Here, the MCE may perform all of these computations and transmit the resource allocation information to all the cells or base stations in the corresponding MBSFN area. Alternatively, the MCE may notify only the allocation information (location of the MBSFN subframe) in the MBSFN area, and each cell or base station may directly select the transmission resource based on the counting result of itself.

At operation 560, the MCE or the base station may determine whether to use the resource determined not to transmit the eMBMS for unicast transmission or not use it for transmission to reduce power consumption. This may be determined by the MCE for minimizing the total network interference or may be determined locally by the base station.

Among the MBSFN subframes commonly applied in the MBSFN area, the remaining subframes excluding the subframe corresponding to eMBMS transmission session may be used by each cell or base station for unicast transmission for radio resource utilization, or may be not used for transmission for reducing RU power usage. When the MCE calculates the resource information for each cell or base station and notifies it, the MCE can determine whether to use the reused MBSFN subframe for unicast transmission or not to use it for transmission so that the inter-cell interference is minimized in the MBSFN area in diverse considerations of the inter-cell interference and the frequency utilization efficiency is maximized. In addition, when transmitting by unicast, the MCE can determine the transmission power. If each cell or base station itself determines the usage of the reused MBSFN subframe at operation 560, as the amount of interference to the neighbor cells is not known, the transmission power of the unicast may be reduced or no transmission is performed so that interference to the neighbor cells is minimized.

At operation 570, the MCE can perform a control operation so that the radio resource is transmitted at the MBSFN subframe according to the determined resource allocation in the MBSFN area. The MCE may schedule the radio resources of the base station by transmitting the MBMS scheduling information to the base station. Each base station in the MBSFN area can transmit radio resources under the control of the MCE. When the reused resource is determined by the base station or cell at operation 560, the radio resource of the base station or cell may be used according to the determination. In the case of unicast transmission, the corresponding cell or base station may notify the position of the MBSFN subframe via SIB2 (system information block type 2) in advance so that the terminals not using the eMBMS do not fail to receive the reused MBSFN subframe due to SIB2. That is, it is possible to enable a terminal not using the eMBMS to receive the reused radio resource via SIB2.

At operation 580, the MCE may determine whether the current time is the time for terminal counting. The terminal counting time may be determined at operation 510. Upon arrival of the terminal counting time, the procedure proceeds to operation 520 at which the MCE may initiate terminal counting and change the eMBMS resource allocation according to the counting result. Operation 580 may be skipped.

Figure 7:
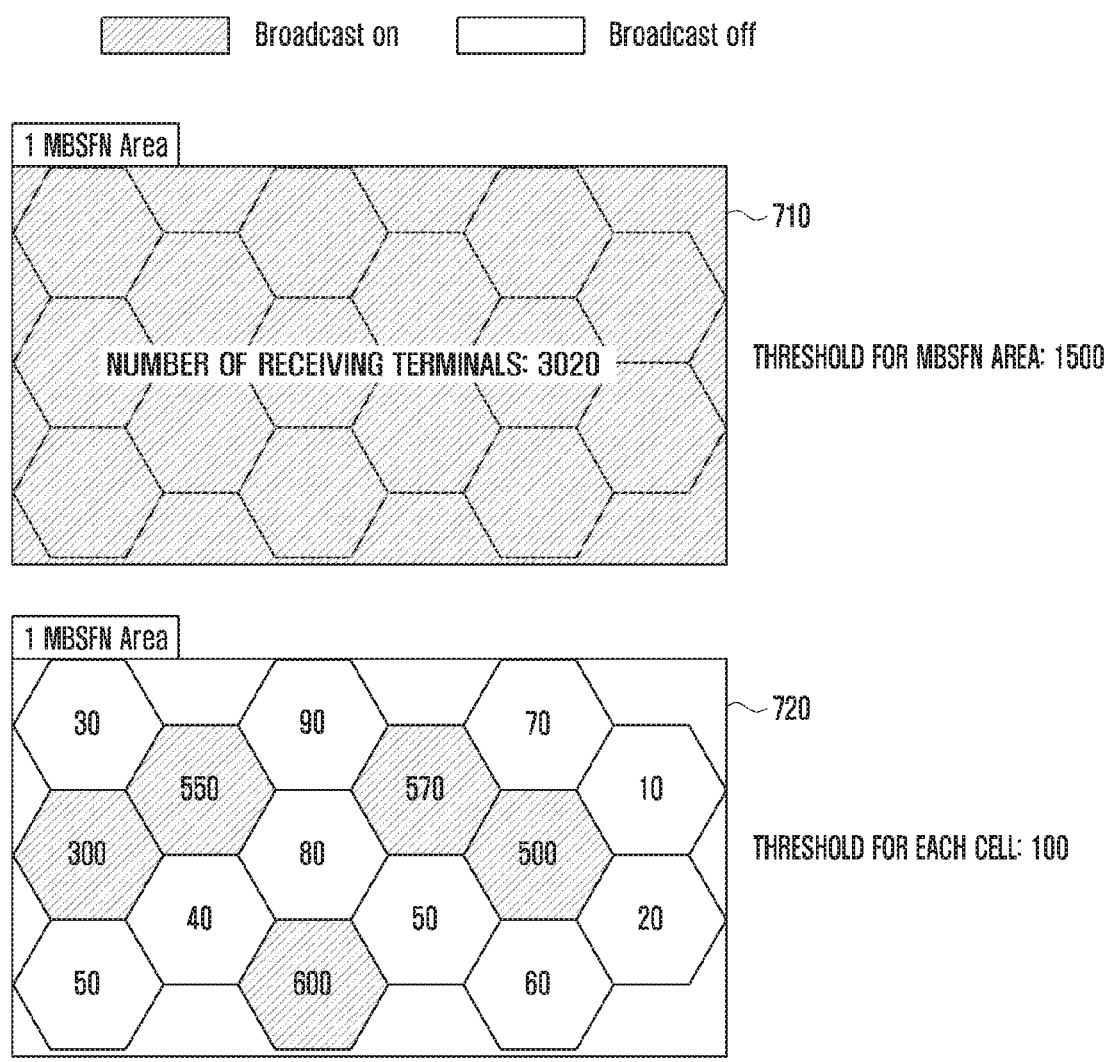
FIG. 7 depicts the radio resource efficiency according to an embodiment of the present invention.

FIG. 7 depicts the radio resource efficiency according to an embodiment of the present invention.

In FIG. 7, reference numeral 710 indicates an embodiment where terminal counting is performed in the entire MBSFN area and whether to perform broadcasting is determined for the entire MBSFN area. Reference numeral 720 indicates an embodiment where terminal counting is performed in each cell of the MBSFN area and whether to perform broadcasting is determined for each cell of the entire MBSFN area.

In the embodiment 710, it is assumed that the threshold is 1500. In the corresponding MBSFN area, when the number of terminals in the entire area greater than or equal to 1500, broadcasting is turned on for the entire MBSFN area. When the number of terminals is less than 1500, broadcasting is turned off for the entire MBSFN area. In this embodiment, as the total number of terminals is 3020, broadcasting is turned on in the entire MBSFN area. Here, whether to turn on or off broadcasting is determined only in consideration of the total number of terminals in the MBSFN area regardless of the number of terminals in each cell.

In the embodiment 720, the total number of terminals in the MBSFN area is 3020, which is the same as that of the embodiment 710. However, in the embodiment 720, turning broadcasting on/off is determined for each cell of the MBSFN area based on the threshold value set for the cell. Here, the cell may mean a base station in the MBSFN area. In the embodiment 720, it is assumed that the threshold is 100 for each cell. In this case, when the number of terminals in a cell is greater than or equal to 100, broadcasting is turned on in the cell. When the number of terminals in a cell is less than 100, broadcasting is turned off in the cell. That is, it is possible to determine whether to turn on or off broadcasting for each cell according to the number of terminals in the cell regardless of the total number of terminals in the MBSFN area.

The total number of terminals in the MBSFN area of the embodiment 710 is the same as that of the embodiment 720. However, in the embodiment 710, since the entire MBSFN area is subject to turning broadcasting on/off, this may be not efficient for a specific cell. In the embodiment 720, among total 15 cells, broadcasting is turned on for five cells with high broadcast efficiency (five cells with 100 terminals or more), but broadcasting is turned off for ten cells with low broadcast efficiency (ten cells with less than 100 terminals). In this case, when a terminal wishes to receive the MBMS service in a cell where broadcasting is turned off, the cell may provide the MBMS service to the terminal via unicast transmission. In this way, resources can be efficiently utilized according to the number of terminals per cell.

Figure 8:
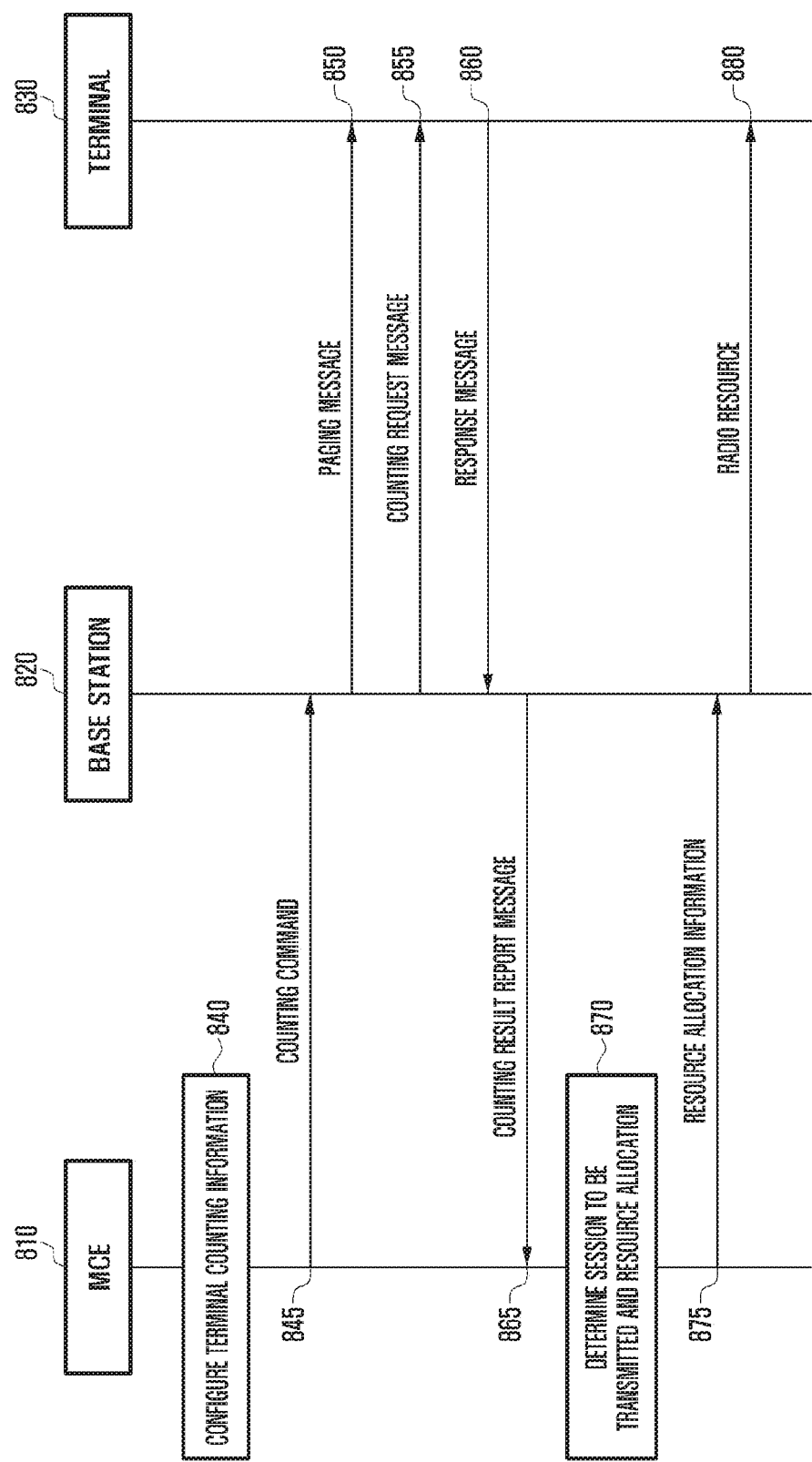
FIG. 8 illustrates operations of individual entities according to an embodiment of the present invention.

FIG. 8 illustrates operations of individual entities according to an embodiment of the present invention.

With reference to FIG. 8, the system providing the MBMS service may include an MCE 810, a base station 820, and a terminal 830. Each entity may appear as multiple instances, but one entity appears once in FIG. 8 for ease of description.

At operation 840, the MCE may configure information for terminal counting. This information may be terminal counting settings. These terminal counting settings may include information about whether to include idle terminals of the MBSFN area in the counting, a paging transmission time for counting terminals, and a timer to transition the terminal back to the idle mode after receiving the paging message.

At operation 845, the MCE 810 may send a terminal counting command to the base station 820. The MCE 810 may transmit a terminal counting command to all or some base stations in the MBSFN area.

The terminal counting command may be a first counting request message. The first counting request message may be an MBMSserviceCountingRequest message. The MCE 810 may transmit the first counting request message via the M2 interface to the base station 820 in the MBSFN area.

The MCE 810 may request the base station 820 to report the number of terminals that are receiving the MBMS service or have a session to be received by sending the terminal counting command Here, the MCE can request the base station to count the number of terminals including idle terminals.

Upon receiving the terminal counting command from the MCE 810, the base station 820 transmits a paging message to the terminal 830 in at least one cell managed by it. The paging message may be a paging message for terminal counting. The paging message for terminal counting may cause idle terminals to transition to the RRC connected state for the purpose of calculating the number of terminals receiving or desiring to receive the MBMS service according to the request of the MCE.

Meanwhile, when the base station transmits a paging message to all terminals, it may be unable to count all the terminals at once owing to the capacity limit for RRC connected terminals. Hence, the base station may group terminals into n groups and transmit a paging message to one of the n groups at a time. This is described in more detail with reference to FIG. 6.

At operation 855, the base station 820 may send a counting request message to the terminal 830. The base station may transmit a counting request message to the terminals in the RRC connected state including those terminals having transitioned from the idle state to the connected state at operation 850.

The counting request message may be a second counting request message. The second counting request message may be an MBMSCountingRequest message. Each base station 820 transmits the second counting request message to the terminals 830 in the RRC connected state to inquire whether the sessions of the eMBMS service are currently received. The base station 820 may transmit the second counting request message to the terminal 830 via the multicast control channel (MCCH).

The second counting request message contains a list of available sessions in the corresponding MBSFN area. Upon receiving the MBMS counting request, the terminal in the MBSFN area may indicate the session that is being received or to be received, and transmit a counting response (MBMS counting response) message containing the indicated session information to the corresponding base station.

At operation 860, the terminal 830 may transmit a response message to the base station. The response message may include information on the session selected from the list of sessions included in the second counting request message. The session to be received may be determined according to user input. If a session to be received at a preset time is set in the terminal 830, the terminal 830 may respond by selecting the session.

Upon reception of the second counting request message, the terminal 830 may identify the currently received MBMS service, and, if necessary, may display a list of MBMS sessions to the user so that the user can select a desired MBMS session. The response message may be an eMBMS counting response message. The terminal 830 may transmit the response message to the base station 820 via the UL-DCCH.

Operations 850 to 860 may be repeatedly performed according to the number of paging groups. That is, if there are n paging groups, operations 850 to 860 may be repeated n times.

After counting all the terminals, at operation 865, the base station 820 may send a counting result report message to the MCE 810. Here, the base station 820 may transmit the per-cell counting result to the MCE 810.

The counting result report message may be an MBMS-ServiceCountingResultsReport message. The base station 820 transmits the counting result received from the terminal 830 to the MCE 810, so that the MCE 810 can identify the number of receiving terminals for each session in the corresponding MBSFN area. The base station 820 may transmit the counting result report message to the MCE 810 via the M2 interface.

In one embodiment, as shown in FIG. 9, information elements can be newly defined for the MBMSServiceCountingResultReport message. FIG. 9 illustrates information elements (IE) for messages according to an embodiment of the present invention. In FIG. 9, the MBMSServiceCountingResultReport message includes an ECGI field. The ECGI field is a field for indicating a result of terminal counting for each cell ID (ECGI). Hence, it is possible to report the terminal counting result for each cell using the above IE.

At operation 870, based on the counting result report messages, the MCE 810 may determine the sessions where broadcast transmission is to be used and determine resource allocation information correspondingly. The MCE 810 may determine the set of sessions where eMBMS transmission is to be used by comparing the number of terminals for each cell or base station 820 with the threshold value set for the cell or base station 820. For the session where eMBMS transmission is not used, no transmission is performed or unicast transmission is individually performed by the base station 820.

Among the MBSFN subframes commonly applied in the MBSFN area, the remaining subframes excluding the subframe corresponding to eMBMS transmission session may be used by each cell or base station for unicast transmission for radio resource utilization, or may be not used for transmission for reducing RU power usage. When the MCE 810 calculates the resource information for each cell or base station and notifies it, the MCE 810 can determine whether to use the reused MBSFN subframe for unicast transmission or not to use it for transmission so that the inter-cell interference is minimized in the MBSFN area in diverse considerations of the inter-cell interference and the frequency utilization efficiency is maximized. In addition, when transmitting by unicast, the MCE can determine the transmission power. If each cell or base station itself determines the usage of the reused MBSFN subframe, as the amount of interference to the neighbor cells is not known, the transmission power of the unicast may be reduced or no transmission is performed so that interference to the neighbor cells is minimized.

After determining the session where eMBMS transmission is to be used and resource allocation in the MBSFN area, at operation 875, the MCE 810 allocates the eMBMS resource only to the preferred session based on the counting result of each cell or base station, and does not allocate the eMBMS resource to the non-preferred session. Here, the MCE 810 may perform all of these computations and transmit the resource allocation information to all the cells or base stations 820 in the corresponding MBSFN area. Alternatively, the MCE 810 may notify only the allocation information (location of the MBSFN subframe) in the MBSFN area, and each cell or base station 820 may directly select the transmission resource based on the terminal counting result of itself. The MCE 810 can notify the base station of the resource allocation result via MBMS scheduling information. The MBMS scheduling information may indicate the identifier of a cell to which broadcast on or off is applied for each session.

In one embodiment, as shown in FIG. 9, a new information element (IE) called "applied ECGI" can be included in the scheduling information. The MCE 810 may use applied ECGI to indicate the identifier of a cell to which broadcast on or off is applied for each session. The base station 820 can examine applied ECGI to identify turning broadcasting on or off for each session. In this way, the MCE 810 may indicate resource allocation information for each cell by transmitting the radio resource allocation information to the base station 820.

At operation 880, the base station 820 may transmit radio resources based on the resource allocation information received from the MCE 810. For a session where the MBMS is not transmitted, no transmission or unicast transmission may be performed according to the determination of the MCE 810. When the MCE have only made a determination not to transmit the MBMS for a particular session, the base station or cell may itself determine to perform no transmission or unicast transmission.

In the case of unicast transmission, the corresponding cell or base station may notify the position of the MBSFN subframe via SIB2 (system information block type 2) in advance so that the terminals not using the eMBMS do not fail to receive the reused MBSFN subframe due to SIB2. That is, it is possible to enable a terminal not using the eMBMS to receive the reused radio resource via SIB2.

Figure 10:
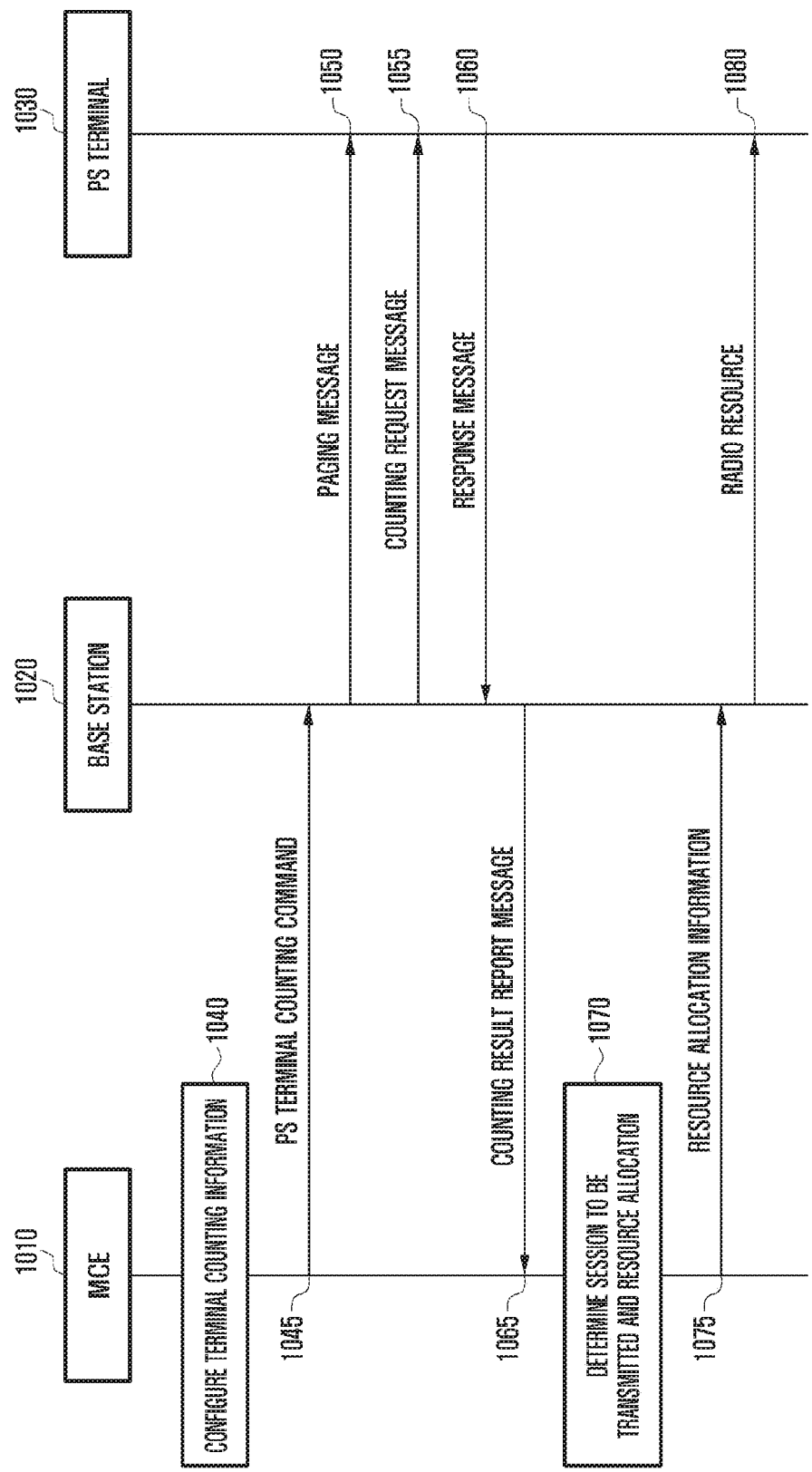
FIG. 10 illustrates the operation of each entity when an embodiment of the present invention is applied to public safety services.

FIG. 10 illustrates the operation of each entity when an embodiment of the present invention is applied to public safety services.

With reference to FIG. 8, the system providing the public safety service may include an MCE 1010, a base station 1020, and a public safety terminal 1030. Each entity may appear as multiple instances, but one entity appears once in FIG. 10 for ease of description. In the following description, the public safety terminal 1030 is referred to as a PS terminal.

At operation 1040, the MCE 1010 may configure information for terminal counting. This information may be settings for counting PS terminals. These PS terminal counting settings may include information about whether to include idle terminals of the MBSFN area in the PS terminal counting, the time to transmit a paging message to idle terminals for counting PS terminals, and a timer to transition the terminal back to the idle mode after receiving the paging message. The PS terminal counting settings may include at least one piece of the above information.

At operation 1045, the MCE 1010 may send a PS terminal counting command to the base station 1020. The MCE 1010 can transmit a PS terminal counting command to all base stations in the public safety service area, or can transmit a PS terminal counting command to some base stations in the public safety service area.

The PS terminal counting command may be a first counting request message. The first counting request message may be an MBMSserviceCountingRequest message. The MCE 1010 may transmit the first counting request message via the M2 interface to the base station 1020 in the public safety service area.

The MCE 1010 may request the base station 1020 to report the number of terminals that are receiving the MBMS service or have a session to be received by sending the PS terminal counting command Here, the MCE 1010 can request the base station to count the number of PS terminals including PS terminals in the idle state.

Upon receiving the PS terminal counting command from the MCE 1010, the base station 1020 transmits a paging message to the PS terminal 1030 in at least one cell managed by it. The paging message may be a paging message for PS terminal counting. The paging message for PS terminal counting may cause idle PS terminals to transition to the RRC connected state for the purpose of calculating the number of PS terminals receiving or desiring to receive the public safety service according to the request of the MCE 1010.

Meanwhile, when the base station 1020 transmits a paging message to all PS terminals, it may be unable to count all the PS terminals at once owing to the capacity limit for RRC connected terminals. Hence, the base station may group terminals into n groups and transmit a paging message to one of the n groups at a time. This is described in more detail with reference to FIG. 6.

At operation 1055, the base station 1020 may send a counting request message to the PS terminal 1030. The base station 1020 may transmit a counting request message to the PS terminals 1030 in the RRC connected state including those PS terminals having transitioned from the idle state to the connected state at operation 1050.

The counting request message may be a second counting request message. The second counting request message may be an MBMSCountingRequest message. Each base station 1020 transmits the second counting request message to the PS terminals 1030 in the RRC connected state to inquire whether the sessions of the eMBMS service are currently received. The base station 1020 may transmit the second counting request message to the terminal 1030 via the multicast control channel (MCCH).

The second counting request message contains a list of available sessions in the corresponding public safety service area.

At operation 1060, the PS terminal 1030 may transmit a response message to the base station 1020. The response message may include information on the session selected from the list of sessions included in the second counting request message. The session to be received may be determined according to user input. If a session to be received at a preset time is set in the PS terminal 1030, the terminal 1030 may respond by selecting the session.

Upon reception of the second counting request message, the PS terminal 1030 may identify the currently received public safety service, and, if necessary, may display a list of public safety sessions to the user so that the user can select a desired public safety session. The PS terminal 1030 may transmit the response message to the base station 1020 via the UL-DCCH.

Operations 1050 to 1060 may be repeatedly performed according to the number of paging groups. That is, if there are n paging groups, operations 1050 to 1060 may be repeated n times.

After counting all the PS terminals, at operation 1065, the base station 1020 may send a counting result report message to the MCE 1010. Here, the base station 1020 may transmit the per-cell counting result to the MCE 1010.

The counting result report message may be an MBMS-ServiceCountingResultsReport message. The base station 1020 transmits the counting result received from the PS terminal 1030 to the MCE 1010, so that the MCE 1010 can identify the number of receiving PS terminals for each session in the corresponding public safety service area. The base station 1020 may transmit the counting result report message to the MCE 1010 via the M2 interface.

In one embodiment, as shown in FIG. 9, information elements can be newly defined for the MBMSServiceCountingResultReport message. FIG. 9 illustrates information elements (IE) for messages according to an embodiment of the present invention. In FIG. 9, the MBMSServiceCountingResultReport message includes an ECGI field. The ECGI field is a field for indicating a result of PS terminal counting for each cell ID (ECGI). Hence, it is possible to report the PS terminal counting result for each cell using the above IE.

At operation 1070, based on the counting result report messages, the MCE 1010 may determine the sessions where broadcast transmission is to be used and determine resource allocation information correspondingly. The MCE 1010 may determine the set of sessions where the public safety service transmission is to be used by comparing the number of PS terminals for each cell or base station 1020 with the threshold value set for the cell or base station 1020. For the session where the public safety service transmission is not used, no transmission is performed or unicast transmission is individually performed by the base station 1020.

Among the MBSFN subframes commonly applied in the public safety service area, the remaining subframes excluding the subframe corresponding to the public safety service transmission session may be used by each cell or base station for unicast transmission for radio resource utilization, or may be not used for transmission for reducing RU power usage. When the MCE 1010 calculates the resource information for each cell or base station and notifies it, the MCE 1010 can determine whether to use the reused MBSFN subframe for unicast transmission or not to use it for transmission so that the inter-cell interference is minimized in the MBSFN area in diverse considerations of the inter-cell interference and the frequency utilization efficiency is maximized. In addition, when transmitting by unicast, the MCE can determine the transmission power. If each cell or base station itself determines the usage of the reused MBSFN subframe, as the amount of interference to the neighbor cells is not known, the transmission power of the unicast may be reduced or no transmission is performed so that interference to the neighbor cells is minimized.

After determining the session where the public safety service transmission is to be used and resource allocation in the MBSFN area, at operation 1075, the MCE 1010 allocates the public safety service resource only to the preferred session based on the counting result of each cell or base station, and does not allocate the public safety service resource to the non-preferred session. Here, the MCE 1010 may perform all of these computations and transmit the resource allocation information to all the cells or base stations 1020 in the corresponding MBSFN area. Alternatively, the MCE 1010 may notify only the allocation information (location of the MBSFN subframe) in the MBSFN area, and each cell or base station 1020 may directly select the transmission resource based on the PS terminal counting result of itself. The MCE 1010 can notify the base station of the resource allocation result via scheduling information for the public safety service (e.g., MBMS scheduling information). The MBMS scheduling information may indicate the identifier of a cell to which broadcast on or off is applied for each session.

In one embodiment, as shown in FIG. 9, a new information element (IE) called "applied ECGI" can be included in the scheduling information. The MCE 1010 may use applied ECGI to indicate the identifier of a cell to which broadcast on or off is applied for each session. The base station 1020 can examine applied ECGI to identify turning broadcasting on or off for each session. In this way, the MCE 1010 may indicate resource allocation information for each cell by transmitting the radio resource allocation information to the base station 1020.

At operation 1080, the base station 1020 may transmit radio resources based on the resource allocation information received from the MCE 1010. For a session where the public safety service transmission is not used, no transmission or unicast transmission may be performed according to the determination of the MCE 1010. When the MCE 1010 have only made a determination not to perform public safety service transmission for a particular session, the base station or cell may itself determine to perform no transmission or unicast transmission.

In the case of unicast transmission, the corresponding cell or base station 1020 may notify the position of the MBSFN subframe via SIB2 (system information block type 2) in advance so that the terminals not using the public safety service do not fail to receive the reused MBSFN subframe due to SIB2. That is, it is possible to enable a terminal not using the public safety service to receive the reused radio resource via SIB2.

Figure 11:
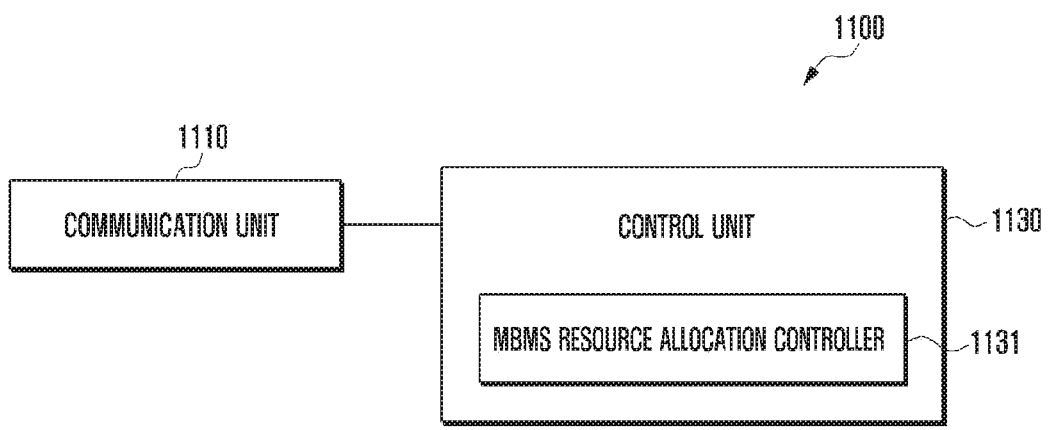
FIG. 11 is a block diagram of an MCE according to an embodiment of the present invention.

FIG. 11 is a block diagram of an MCE according to an embodiment of the present invention.

With reference to FIG. 11, the MBMS coordination entity (MCE) 1100 may include a communication unit 1110 and a control unit 1130. The communication unit 1110 may be configured to receive and transmit signals from and to another entity. The control unit 1130 may control the overall operation of the MCE 1100. The control unit 1130 may include an MBMS resource allocation controller 1131. The MBMS resource allocation controller 1131 can determine whether to perform broadcasting for each session based on the terminal counting information received from the base station.

In one embodiment, the control unit 1130 may be configured to control transmitting a terminal counting request message to at least one base station in the multicast broadcast single frequency network (MBSFN) area, receiving a counting result message including information on the number of terminals receiving a multimedia broadcast multicast service (MBMS) session for each cell of the base station from the base station, and determining MBMS resource allocation for each cell in the MBSFN area based on the counting result message.

The control unit 1130 may be configured to control determining, if the number of terminals receiving the MBMS session in a cell is less than a threshold preset for the cell, resource allocation so that no transmission or unicast transmission is performed for the MBMS session.

Here, the terminal counting request message may include a counting request for idle terminals receiving the MBMS session in the MBSFN area. To count idle terminals, the base station may transmit a paging message via each cell thereof to cause idle terminals to transition to the radio resource control (RRC) connected state.

The terminal may be a mission critical push-to-talk (MCPTT) terminal supporting public safety long term evolution (PS-LTE).

The control unit 1130 may control the MCE 1100 to perform MCE operations of the embodiments of the present invention described with reference to FIGS. 1 to 10.

Figure 12:
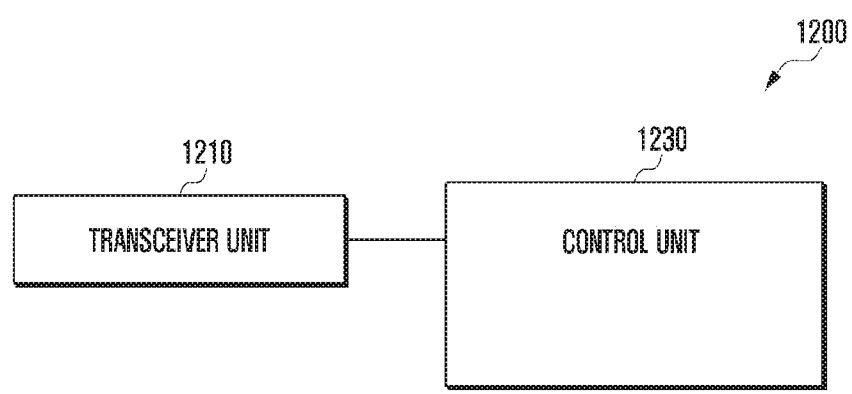
FIG. 12 is a block diagram of a base station according to an embodiment of the present invention.

FIG. 12 is a block diagram of a base station according to an embodiment of the present invention.

With reference to FIG. 12, the base station 1200 may include a transceiver unit 1210 and a control unit 1230. The transceiver unit 1210 may be configured to receive and transmit signals from and to another entity. The control unit 1230 may control the overall operation of the base station 1200.

In one embodiment, the control unit 1230 may be configured to control receiving a first terminal counting request message indicating the number of terminals for each cell in the MBSFN area from the MBMS coordination entity (MCE), transmitting a second terminal counting request message from each cell of the base station to terminals based on the first terminal counting request message, receiving a response message indicating whether the MBMS session is received by each terminal from the terminal, transmitting a counting result message including information on the number of terminals for each cell of the base station to the MCE based on the response messages, and receiving MBMS resource allocation information for each cell in the MBSFN area, prepared by the MCE based on the counting result message, from the MCE.

The control unit 1230 may be configured to control determining, if the number of terminals receiving the MBMS session in a cell is less than a threshold preset for the cell, resource allocation so that no transmission or unicast transmission is performed for the MBMS session on the basis of the MBMS resource allocation information.

The control unit 1230 may be configured to control transmitting a paging message for counting idle terminals in the MBSFN area on the basis of the first counting request message.

To transmit a paging message, the control unit 1230 may be configured to control grouping terminals into n groups, transmitting a paging message for each group, transmitting a second terminal counting request message for the group, and receiving a response message for the group.

The terminal may be a mission critical push-to-talk (MCPTT) terminal supporting public safety long term evolution (PS-LTE).

The control unit 1230 may control the base station 1200 to perform base station operations of the embodiments of the present invention described with reference to FIGS. 1 to 10.

Figure 13:
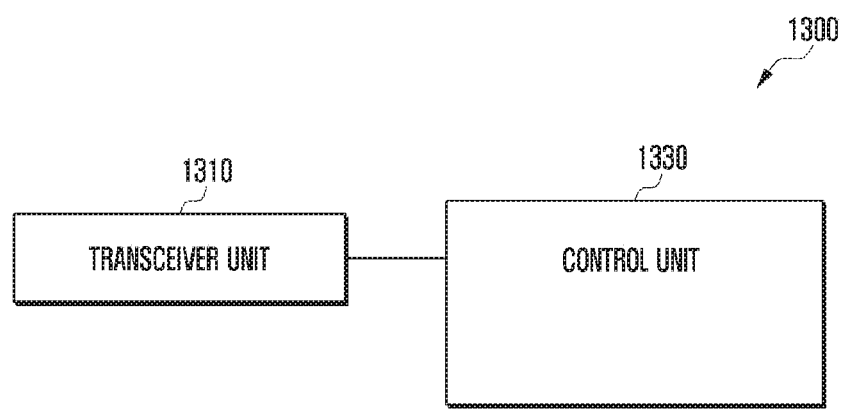
FIG. 13 is a block diagram of a terminal according to an embodiment of the present invention.

FIG. 13 is a block diagram of a terminal according to an embodiment of the present invention.

With reference to FIG. 13, the terminal 1300 may include a transceiver unit 1310 and a control unit 1330. The transceiver unit 1310 may be configured to receive and transmit signals from and to another entity. The control unit 1330 may control the overall operation of the terminal 1300.

The control unit 1330 may control the terminal to perform terminal operations of the embodiments of the present invention described with reference to FIGS. 1 to 9.

As described above, through the embodiments of the present invention, it is possible to accurately identify the number of receiving terminals in the eMBMS and survey accurate audience ratings for various pieces of content. Since viewer ratings are directly linked to advertisement, advertising capital can be introduced through reliable ratings, making it possible to provide high-quality content. It is expected that the eMBMS service will be more activated through this virtuous circle structure. In addition, by using the proposed eMBMS radio resource management scheme, it is possible to maximize the frequency utilization rate by enabling more optimized radio resource utilization than the existing operation scheme, thus technically benefiting the country, the network operator, and the terminal users. When eMBMS radio resources are not used, there is a choice of power saving, which can alleviate the burden on the network operating power cost of the network operator.

In particular, this eMBMS system operation scheme may have a greater influence on the MCPTT service where the public safety (PS-LTE) eMBMS is introduced. Since the group communication of the MCPTT itself operates in broadcast mode, most radio resources are transmitted through downlink broadcasting. It is expected that the transmission power reduction and resource utilization efficiency will be better in comparison to existing commercial networks (up to 60 percent in LTE) where some resources are used for broadcasting.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

What is claimed is:

1. A multimedia broadcast multicast service (MBMS) coordination entity (MCE) providing a broadcast service in a wireless communication system, the MCE comprising:
   a transceiver configured to transmit and receive a signal; and
   a controller coupled with the transceiver and configured to:
       transmit, to a base station in a multicast broadcast single frequency network (MBSFN) area, a terminal counting request message,
       receive, from the base station, a counting result message including information on a number of terminals per cell of the base station, an MBMS session being provided to the terminals,
       allocate a first resource for the MBMS session among MBMS resources to each cell of the base station in the MBSFN area based on the number of the terminals per cell included in the counting result message and interference information between each cell of the base station in the MBSFN area, and
       determine whether to use a second resource, which is not allocated for the MBMS session among the MBMS resources, for unicast transmission or not, based on the interference information.

2. The MCE of claim 1,
   wherein, in case that the number of terminals receiving the MBMS session in a cell is equal to or more than a threshold preset for the cell, the first resource is allocated to the cell, and
   wherein the controller is further configured to determine, in case that the number of terminals receiving the MBMS session in a cell is less than a threshold preset for the cell, not to allocate the first resource to the cell.

3. The MCE of claim 1,
   wherein a paging message is transmitted from the base station on each cell of the base station to cause radio resource control (RRC) idle state terminals to transition
to a RRC connected state based on the terminal counting request message, and
wherein the terminal counting request message includes a
counting request for the RRC idle state terminals
receiving the MBMS session in the MBSFN area.

4. The MCE of claim 1, wherein the terminal is a mission critical push-to-talk (MCPTT) terminal supporting public safety long term evolution (PS-LTE).

5. A method performed by a multimedia broadcast multicast service (MBMS) coordination entity (MCE) to provide a broadcast service in a wireless communication system, the method comprising:
   transmitting, to a base station in a multicast broadcast single frequency network (MBSFN) area, a terminal counting request message;
   receiving, from the base station, a counting result message including information on a number of terminals per cell of the base station, an MBMS session being provided to the terminals;
   allocating a first resource for the MBMS session among MBMS resources to each cell of the base station in the MBSFN area based on the number of the terminals per cell included in the counting result message and interference information between each cell of the base station in the MBSFN area; and
   determining whether to use a second resource, which is not allocated for the MBMS session among the MBMS resources, for unicast transmission or not based on the interference information.

6. A base station providing a broadcast service in a wireless communication system, comprising:
   a transceiver configured to transmit and receive a signal; and
   a controller coupled with the transceiver and configured to:
      receive, from a multimedia broadcast multicast service (MBMS) coordination entity (MCE), a first terminal counting request message indicating to count a number of terminals per cell of the base station in a multicast broadcast single frequency network (MBSFN) area,
      transmit a second terminal counting request message from each cell of the base station to terminals based on the first terminal counting request message,
      receive, from each of the terminals, a response message indicating whether an MBMS session is provided to each of the terminals,
      transmit, to the MCE, a counting result message including information on a number of terminals per cell of the base station based on the response messages,
      receive, from the MCE, MBMS resource allocation information for each cell of the base station in the MBSFN area, prepared by the MCE based on the number of the terminals per cell included in the counting result message and interference information between each cell of the base station in the MBSFN area, and
      receive, from the MCE, in case that the base station is not allocated the MBMS resource allocation, unicast transmission resource allocation information based on the interference information.

7. The base station of claim 6, wherein the controller is configured to determine, in case that the number of terminals receiving the MBMS session in a cell is less than a threshold preset for the cell, to allocate a unicast transmission resource for the MBMS session to the cell based on the unicast transmission resource allocation information.

8. The base station of claim 6,
   wherein the controller is configured to transmit a paging message to cause radio resource control (RRC) idle state terminals to transition to a RRC connected state based on the first counting request message, and
   wherein the first terminal counting request message includes a counting request for the RRC idle state terminals receiving the MBMS session in the MBSFN area.

9. The base station of claim 6, wherein the terminal is a mission critical push-to-talk (MCPTT) terminal supporting public safety long term evolution (PS-LTE).

10. A method performed by a base station to provide a broadcast service in a wireless communication system, the method comprising:
   receiving, from a multimedia broadcast multicast service (MBMS) coordination entity (MCE), a first terminal counting request message indicating to count a number of terminals per cell of the base station in a multicast broadcast single frequency network (MBSFN) area;
   transmitting a second terminal counting request message from each cell of the base station to terminals based on the first terminal counting request message;
   receiving, from each of the terminals, a response message indicating whether an MBMS session is provided to each of the terminals;
   transmitting, to the MCE, a counting result message including information on a number of terminals per cell of the base station based on the response messages;
   receiving, from the MCE, MBMS resource allocation information for each cell of the base station in the MBSFN area, prepared by the MCE based on the number of the terminals per cell included in the counting result message and interference information between each cell of the base station in the MBSFN; and
   receiving, from the MCE, in case that the base station is not allocated the MBMS resource allocation, unicast transmission resource allocation information based on the interference information.

11. The MCE of claim 1,
   wherein the broadcast service is a public safety (PS) service,
   wherein the MBMS session is a PS service session, and
   wherein the MBMS resources are resources to be used for the PS service session.

12. The base station of claim 6,
   wherein the broadcast service is a public safety (PS) service, and
   wherein the MBMS session is a PS service session.

13. The method of claim 5, further comprising:
   determining, in case that the number of terminals receiving the MBMS session in a cell is less than a threshold preset for the cell, not to allocate the first resource to the cell.

14. The method of claim 5,
   wherein a paging message is transmitted from the base station on each cell of the base station to cause radio resource control (RRC) idle state terminals to transition to a RRC connected state based on the terminal counting request message, and
   wherein the terminal counting request message includes a counting request for the RRC idle state terminals receiving the MBMS session in the MBSFN area.

15. The method of claim 5, wherein the terminal is a mission critical push-to-talk (MCPTT) terminal supporting public safety long term evolution (PS-LTE).

16. The method of claim 5,
wherein the broadcast service is a public safety (PS) service, and
wherein the MBMS session is a PS service session.

17. The method of claim 10, further comprising:
determining, in case that the number of terminals receiving the MBMS session in a cell is less than a threshold preset for the cell, to allocate a unicast transmission resource for the MBMS session to the cell based on the unicast transmission resource allocation information.

18. The method of claim 10, further comprising:
transmitting a paging message to cause radio resource control (RRC) idle state terminals to transition to a RRC connected state based on the first counting request message,
wherein the first terminal counting request message includes a counting request for the RRC idle state terminals receiving the MBMS session in the MBSFN area.

19. The method of claim 10, wherein the terminal is a mission critical push-to-talk (MCPTT) terminal supporting public safety long term evolution (PS-LTE).

20. The method of claim 10,
wherein the broadcast service is a public safety (PS) service, and
wherein the MBMS session is a PS service session.

\* \* \* \* \*